A. M. HOUSER.
TRAP.
APPLICATION FILED JUNE 9, 1910.
1,114,141.
Patented Oct. 20, 1914.
5 SHEETS—SHEET 1.
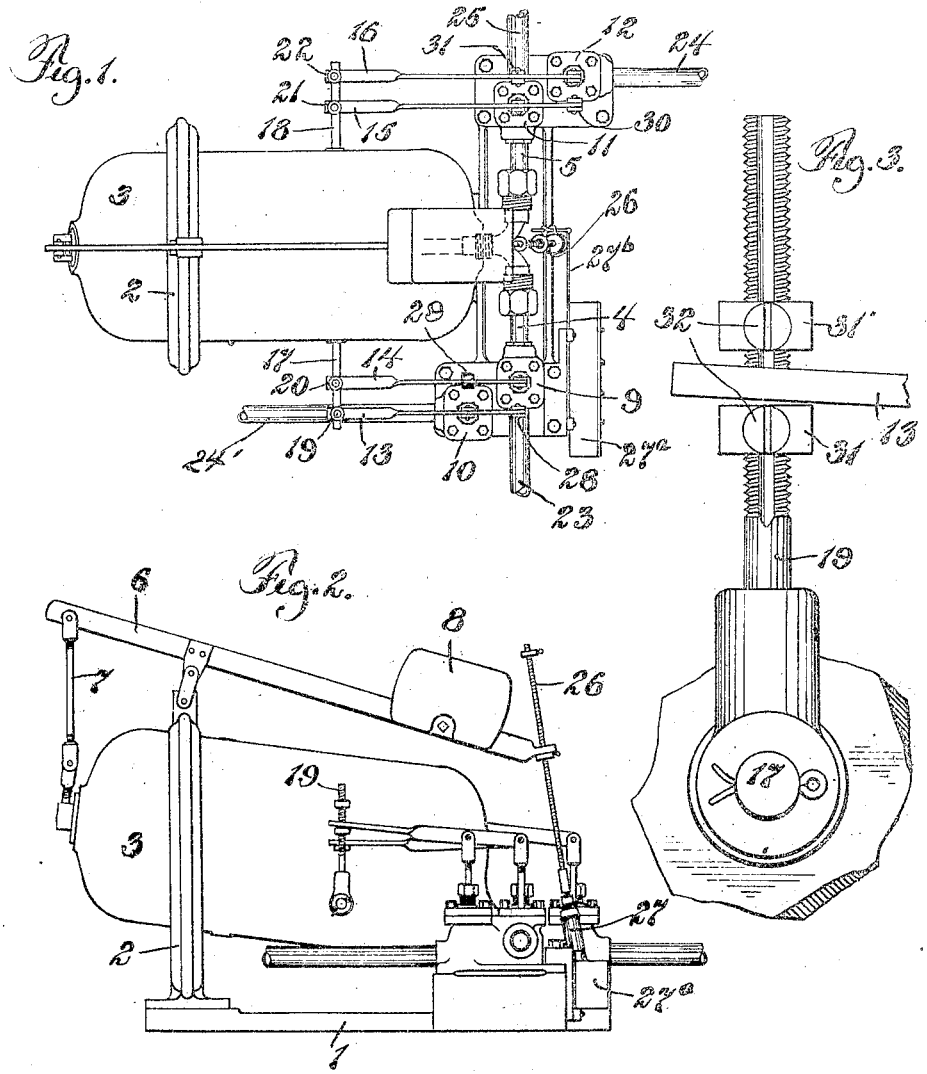
WITNESSES
Harry L. Lechner
J. C. Bradley
INVENTOR
A. M. Houser
by atty Paul Synnestvedt

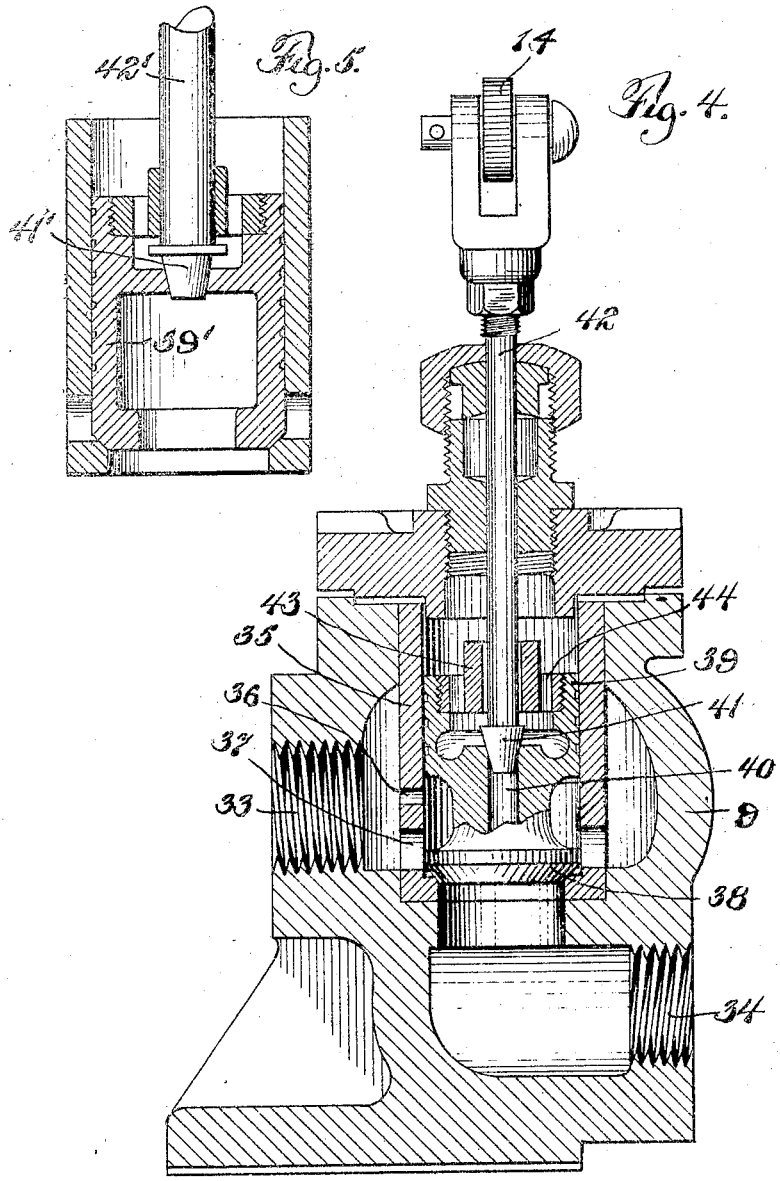

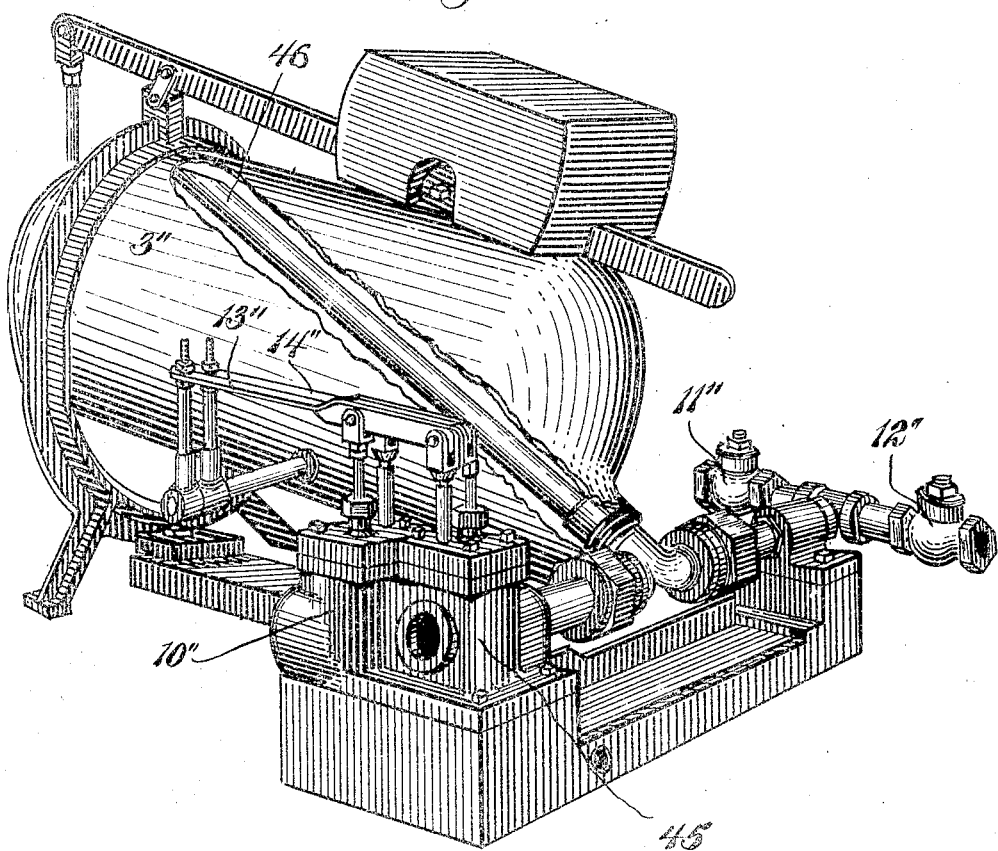

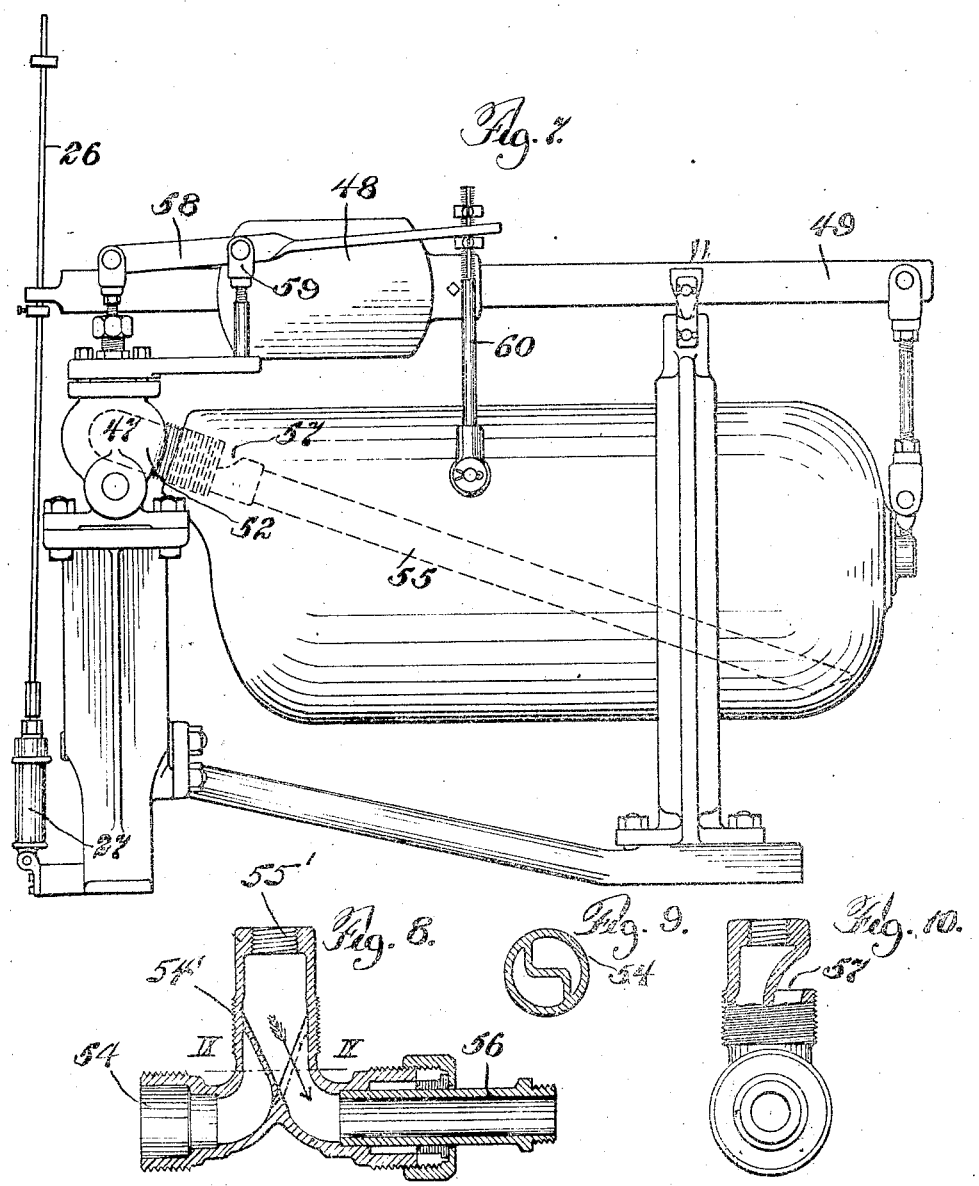

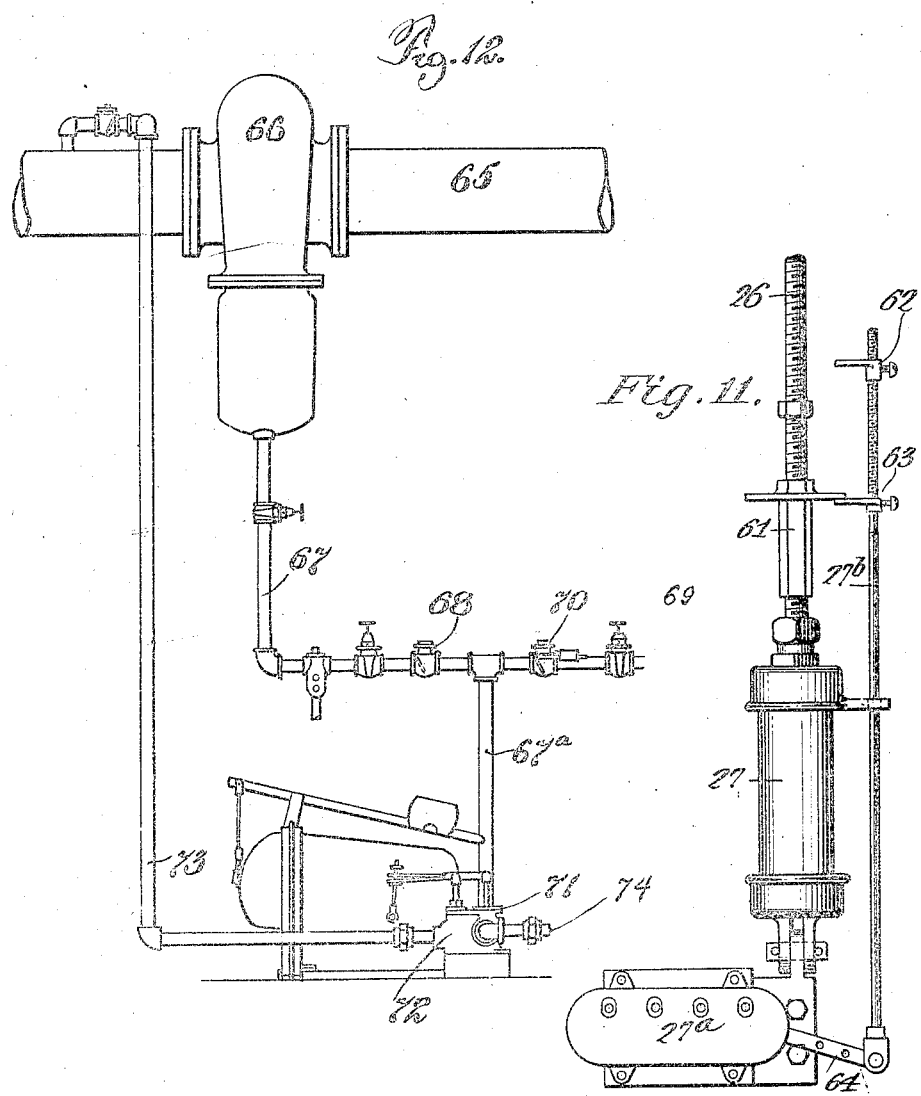

UNITED STATES PATENT OFFICE.

ARTHUR M. HOUSER, OF CHICAGO, ILLINOIS, ASSIGNOR TO CRANE COMPANY, OF CHICAGO, ILLINOIS, A CORPORATION OF ILLINOIS.

TRAP.

1,114,141.  Specification of Letters Patent.  Patented Oct. 20, 1914.

Application filed June 9, 1910. Serial No. 565,999.

*To all whom it may concern:*

Be it known that I, ARTHUR M. HOUSER, a citizen of the United States, residing at Chicago, in the county of Cook and State of Illinois, have invented certain new and useful Improvements in Traps, of which the following is a specification.

The invention relates in general to traps, and the valve mechanism and operating means therefor.

It has for its principal objects; the provision of a tilting trap having an improved type of valve easily and positively operated, wherein the pressure assists in opening the valve; the provision of a trap having an improved adjustable means for securing the independent and positive actuation of the various valves; and the provision of a trap particularly adapted for accurate measurement when used with a recorder as a metering device. Certain embodiments of the invention are illustrated in the accompanying drawings, in which—

Figure 1 is a plan view of a return trap; Figure 2 is a side elevation of the trap of Figure 1; Figure 3 is an enlarged side elevation showing the adjustable connection between an operating lever and the body of the trap; Figure 4 is an enlarged section through one of the valves employed in the trap; Figure 5 is an enlarged section through a modified form of valve; Figure 6 is a perspective view of another form of return trap; Figure 7 is a side elevation of a non-return trap with the invention applied thereto; Figure 8 is a section through the admission and outlet passages constituting the axis of the trap of Figure 7; Figure 9 is a section on the lines IX—IX of Figure 8; Figure 10 is an end view of the pipes shown in Fig. 8, the main pipe being broken away; Figure 11 is a detail view of a dash-pot mechanism for cushioning the trap and of a recording device operated thereby, and Figure 12 is a view showing the application of the invention to a vacuum system.

My invention is designed for use in connection with systems where there is a condensation of oil, water or other fluid, such for example as heating systems, boilers, engines, etc., whether or not such systems are operated under steam, air, or vacuum pressures, or a combination thereof. The chief object of my invention is to provide a trap which is accurate, effective and quick in operation, to which end I have provided the valve mechanism and operating means therefor shown in the drawings and hereinafter described.

Referring to the trap as shown in Figures 1 and 2, the principal parts may be enumerated as follows: 1 is the frame-work of the trap, which frame-work is provided with a loop portion 2 embracing the body of the tank; 3 is the tank mounted for oscillation within the loop 2, having the pipes 4 and 5 as its axis of movement, 4 being the live steam or air inlet, and 5 being the liquid inlet and also the liquid outlet of the trap; 6 is a lever pivoted to the top of the loop 2 intermediate its ends and secured to one end of the tank by means of the connecting rod 7 and carrying at its other end the weight 8; 9 is the casing of the valve for controlling the admission of live steam or air to the tank; 10 is the casing of the valve for controlling the venting of the air from the tank; 11 is the casing of the valve for controlling the flow of the liquid condensation to the tank; 12 is the casing of the valve for controlling the flow of the liquid from the tank back through the discharge outlet; 13, 14, 15, and 16 are levers for operating the various valves, such levers being connected to the rods 17 and 18 projecting from the sides of the tank, by means of pivoted connecting rods 19, 20, 21, and 22; 23 is the live steam or air inlet; 24 is the outlet pipe leading to the boiler or elsewhere; 25 is the liquid inlet leading to the tank; 24' is the air venting pipe; and 26 is a rod with adjustable stops, operated by the movement of the lever 6 and secured at one end to a dash-pot mechanism 27 for cushioning the trap as it tilts, said rod operating a recording device hereinafter to be described.

The casings for the valves are cast in one piece and are provided with passages connecting the pipes leading thereto with the pipes 4 and 5 constituting the trunnion of the trap.

For convenience, the operation of the trap will be described as the trap is applied to steam pressure. The tank as shown in Figure 2 occupies the position shown when empty or while filling, and when in this position the live steam valve in the casing 9 is closed, the venting valve in the casing 10 is open to permit the exhaust of air from the tank as it is filled with the water of condensation, the valve in the casing 11 is open to permit the liquid to flow into the tank, and the valve in the casing 12 is closed, thereby shutting off communication between the trap and the boiler. When the tank becomes filled, the weight 8 is overbalanced and the body 3 moves downwardly, which movement secures the closing of the inlet valve in the casing 11, and the air venting valve in the casing 10, and secures the opening of the live steam valve in the casing 9 and the outlet valve in the casing 12, and the incoming live steam allows the water to flow from the tank through the pipe 5 to the outlet valve and through the pipe 24 to the boiler, the movement of the lever 6 at the same time causing the actuation of the rod 26 and dash-pot 27 together with the recorder 27ª through the connection 27ᵇ.

Each of the levers 13, 14, 15, and 16 is connected to the upper end of a valve stem, and these levers are fulcrumed respectively at the points 28, 29, 30, and 31. The connection between the ends of the operating levers and the various connecting rods is indicated in Figure 3. As here shown the rod 19 is pivoted at its lower end to the rod or stud 17, and is screw-threaded along its upper portion. A pair of nuts 31' are mounted upon the threaded portion of the rod and are held in adjusted position by means of the set screws 32, the ends of the lever 13 fitting between the nuts. This arrangement provides for the convenient adjustment of the lever, and the lost motion permitted between the two ends is desirable, as a sharper and more positive movement of the valve is thus secured, and the desired degree of travel given the valve independent of the extent of movement of the body of the trap. Furthermore, the valve is actuated only as the tank approaches the end of its movement.

The valve as shown in Figure 4 is preferably the construction used in the casings 9 and 12, although the valves in the casings 10 and 11 may be similarly constructed. The valve in Figure 4 is numbered as applied to the casing 9, 33 being connected to the pipe 23, and the opening 34 being connected to the pipe 4 leading to the trap. The body of the valve is provided with a bushing 35 having a series of ports 37, and if desired, an additional port 36, to maintain equality of pressures between the chamber around the piston stem and the inlet 33, and in the bushing is mounted a valve device having a disk 38 and the piston portion 39. This valve is provided with a central passage 40 controlled by a pilot valve 41, which pilot valve is carried by a stem 42 engaging the lever 14 at its upper end. A plug 43 is screwed into the piston above the pilot valve, and is provided with passages 44. The pilot valve and the pressure above the piston 39 (which is loose enough to allow certain leakage past it) normally holds the disk 38 in the position shown, while the tank is filling. Upon the tilting of the tank the pilot valve is lifted, and the accumulated pressure above the piston 39 being allowed to escape, the valve disk 38 is quickly and readily opened, which admits live steam to the tank, through the opening 34 and pipe 4, and allows the water in the tank to flow through the pipes 5 and 24, the valve of the casing 12 having been simultaneously opened. The arrangement provides not only for the quick opening of the pilot valve, but the trap is more sensitive and accurate, as much less force is required to move the pilot valve than would be necessary to move the main valve itself.

In Figure 5 a modified form of valve is illustrated, such valve being provided with a pilot valve 41' carried by a stem 42'. Instead of the disk employed in the other form of valve, the piston 39' is formed at its lower end so as to co-act with the valve seat, and is preferably hollowed out in the manner illustrated.

In Figure 6 another form of return trap is illustrated, the structure differing from that of Figures 1 and 2 principally in that the check valves 11" and 12" are provided instead of the valves 11 and 12 as shown in Figure 1. In this construction the valve in the casing 45 corresponds to the valve illustrated in Figure 4, such valve and the air vent valve 10" being operated by levers 14" and 13" substantially in the same manner as in the construction of Figure 1. The casing of the tank 3" is broken away in this figure so as to show the location of the live steam inlet pipe 46, the devices of Figures 1 and 2 having a corresponding pipe, which is a well known arrangement in the art.

In Figure 7 a modified form of trap is illustrated, such trap being somewhat differently arranged as to the mounting of the tank, and being of the type commonly called a non-return trap. In this case the tank is pivotally mounted on an axis 47, and is held in the position shown, when empty or while filling, by means of the weight 48 and lever 49. The end of the lever 49 engages the rod 26 which actuates a dash pot device 27. A valve 52 corresponding in construction to the valve shown in Figure 4 controls the outlet from the trap, such valve 52 being connected to the outer end of the pipe 56 forming a portion of the axis of the trap (Figure 8). The inner end of the pipe 56 is connected to the T 54' to which the pipe 55 is connected at 55'. The other side of the T (Figure 8) is provided with an inlet pipe (not shown) leading into the part 54, and such part is connected with the interior of the trap by means of the cut away portion 57. The stem of the valve is operated by the lever 58 fulcrumed at 59 and having an adjustable connection with the rod 60 pivoted to the tank.

Referring now more particularly to Figure 11, it will be seen that the rod 26 which actuates the dash-pot 27 to cushion the trap as it tilts, carries a collar 61 which engages stops 62 and 63 adjustably mounted on the rod 27ᵇ which is supported from the dash-pot 27. This rod 27ᵇ is moved by the stops as the rod 26 moves when the trap tilts, and actuates the recorder 27ᵃ through the medium of the lever 64 pivoted at the lower end of the rod.

In Figure 12 I have shown my invention applied to a vacuum system, 65 being a portion of the vacuum line leading to a vacuum pump (not shown), and 66 being a separator to receive the condensation. A drain pipe 67 leads from the separator to the trap, and is provided with a check valve 68 opening to the trap. The discharge pipe 69 is provided with a weighted check valve 70. A live steam or air pressure supply pipe 74, inlet valve 71 and a venting valve 72 are provided of the construction and operation heretofore described, a vent pipe 73 leading from the venting valve 72 to the vacuum line in the manner illustrated. The operation is as follows: The condensation of the system drops by gravity into the drain pipe 67 and passes through the check valve 68 and thence through the portion 67ᵃ of the drain pipe into the trap, the weighted check valve 70 remaining closed. When the trap tilts the steam or air pressure valve 71 is opened, admitting pressure to the trap, which pressure drives the condensation through the pipe 67ᵃ and through the check valve 70, to the discharge pipe 69, the valve 68 being closed by the pressure. When the trap returns to normal position the inlet valve 71 is closed and the vent valve 72 opened, the pressure remaining in the tank and pipe 67ᵃ being drawn through the vent pipe 73 back into the vacuum line by the vacuum pressure. As the weighted check valve closes when the pressure is cut off, the venting of the trap pressure into the vacuum line equalizes the pressures in the drain pipe 67, the pipe 67ᵃ and the trap, and the device is again ready to fill.

Referring to Figure 4 of the drawings it will be noted that I have provided the pilot valve 41 with an enlarged shoulder portion which takes against the plug 43 and raises the piston and controlling valve 38, thus providing a means for positively actuating said piston and valve should the reduction of pressure fail to secure initial movement of the valve. It will be noted also that the passage 40 extending through the piston 39 and valve 38 is unobstructed, save of course when closed by the pilot valve 41. This arrangement and the provision of the piston 39 so that pressure will leak or bleed to the upper portion of the closed chamber obviates the necessity of a complicated packed valve device provided with communicating ports, and affords a convenient and simple mechanism.

Having thus described my invention and illustrated its use, what I claim as new and desire to secure by Letters Patent is the following:—

1. A steam trap comprising in combination, a tilting tank having a conduit, a valve casing in the conduit, a main pressure controlled piston valve loosely mounted in said casing and having a restricted passage therethrough leading to the discharge side of the casing, a pressure chamber above said valve adapted to receive a predetermined amount of pressure from the tank to normally hold the valve closed on its seat, a pilot valve for said restricted passage and constructed to have a lesser cross-sectional area than that of the main valve, and a connection between the pilot valve and the tank whereby the former is actuated on the tilting of the tank, substantially as and for the purpose set forth.

2. In a steam trap, a tilting tank having an exhaust conduit, a valve casing in the conduit, a main piston valve loosely mounted in said casing subject to pressure from the tank and having a restricted passage leading to the discharge side of the casing, a pressure chamber above said valve for receiving a predetermined amount of pressure from the tank past the piston to normally hold the valve closed on its seat, a pilot valve in said pressure chamber controlling the said restricted passage and having a lesser cross-sectional area than that of the main valve, and means actuated by the tilting of the tank for operating the pilot valve thereby exhausting the pressure in the pressure chamber through the said restricted passage whereby the main valve is caused to rise by the action of the pressure from the tank to empty the tank.

3. In a steam trap, a tilting tank having an admission conduit; a valve casing in the conduit having a pressure inlet opening; a main piston valve loosely mounted in said casing subject to pressure from the inlet side of the casing and having a restricted passage therethrough leading to the discharge side of the casing; a pressure chamber above said valve adapted to receive a predetermined amount of pressure from the inlet side of the casing and past the piston to normally hold the valve closed down on its seat; a pilot valve extending through the casing for controlling the said restricted passage and having a lesser cross-sectional area than that of the main valve; and means actuated by the tilting of the tank for operating the pilot valve, whereby to exhaust the pressure in the pressure chamber and thereby permit the main valve to have positive lifting movement to admit pressure to the tank through the said admission conduit.

In testimony whereof I have hereunto signed my name in the presence of the two subscribed witnesses.

ARTHUR M. HOUSER.

Witnesses:
F. T. DONOHUE,
M. W. LINK.